United States Patent
Pfeifer et al.

[11] Patent Number: 5,842,392
[45] Date of Patent: Dec. 1, 1998

[54] INDEXING DEVICE AND METHOD OF DRIVING THE SAME

[75] Inventors: Wolfgang Pfeifer, Esslingen, Germany; Kenji Sugimoto, Tokyo; Hiroshi Shinohara, Kawagoe, both of Japan

[73] Assignee: Citizen Watch Co., Ltd., Tokyo, Japan

[21] Appl. No.: 945,393
[22] PCT Filed: Dec. 13, 1996
[86] PCT No.: PCT/JP96/03656
§ 371 Date: Oct. 27, 1997
§ 102(e) Date: Oct. 27, 1997
[87] PCT Pub. No.: WO98/25729
PCT Pub. Date: Jun. 18, 1998
[51] Int. Cl.[6] .............................. B23B 9/00; B23B 39/20
[52] U.S. Cl. ............................... 82/1.11; 82/120; 82/121; 408/35
[58] Field of Search ......................... 82/1.11, 119, 120, 82/121, 905; 29/40, 564.1, 27 C; 408/35

[56] References Cited

U.S. PATENT DOCUMENTS

| Re. 31,288 | 6/1983 | Matsuzaki et al. ............... 409/211 X |
| 4,090,281 | 5/1978 | Hautau .............................. 408/35 X |
| 4,413,539 | 11/1983 | Ishizuka et al. ...................... 82/120 |
| 4,570,313 | 2/1986 | Holmstrom et al. ................ 29/27 C |
| 5,455,993 | 10/1995 | Link et al. ............................. 29/40 |

FOREIGN PATENT DOCUMENTS

| 58-132431 | 8/1983 | Japan . |
| 4-226813 | 8/1992 | Japan . |
| 7-100703 | 4/1995 | Japan . |

*Primary Examiner*—Andrea L. Pitts
*Assistant Examiner*—Henry W. H. Tsai
*Attorney, Agent, or Firm*—Armstrong, Westerman Hattori, McLeland & Naughton

[57] ABSTRACT

There are provided a pair of positioning engaging members (27) which are engageable with or disengageable from each other between a base table (10) and a turret (11), and the turret (11) is prevented from rotating when the positioning engaging members (27) engage with each other. The turning of a ball screw (21) or a nut (25) is changed to a linear motion of the turret (11) by a screw feed mechanism comprising the ball screw (21) and nut (25) for performing engagement and disengagement between the positioning engaging members (27). The screw feed mechanism is driven by a first motor (24), and the turret (11) is indexing by a second motor (32). When the second motor (32) is driven to index the turret (11), the first motor (24) rotates in a given rotating direction with a given ratio of rotating speed relative to the rotation of the second motor (32) so as to make the relative turning between the ball screw (21) and nut (25) of the screw feed mechanism zero, thereby preventing the linear motion of the positioning engaging members (27).

3 Claims, 8 Drawing Sheets

F I G. 1
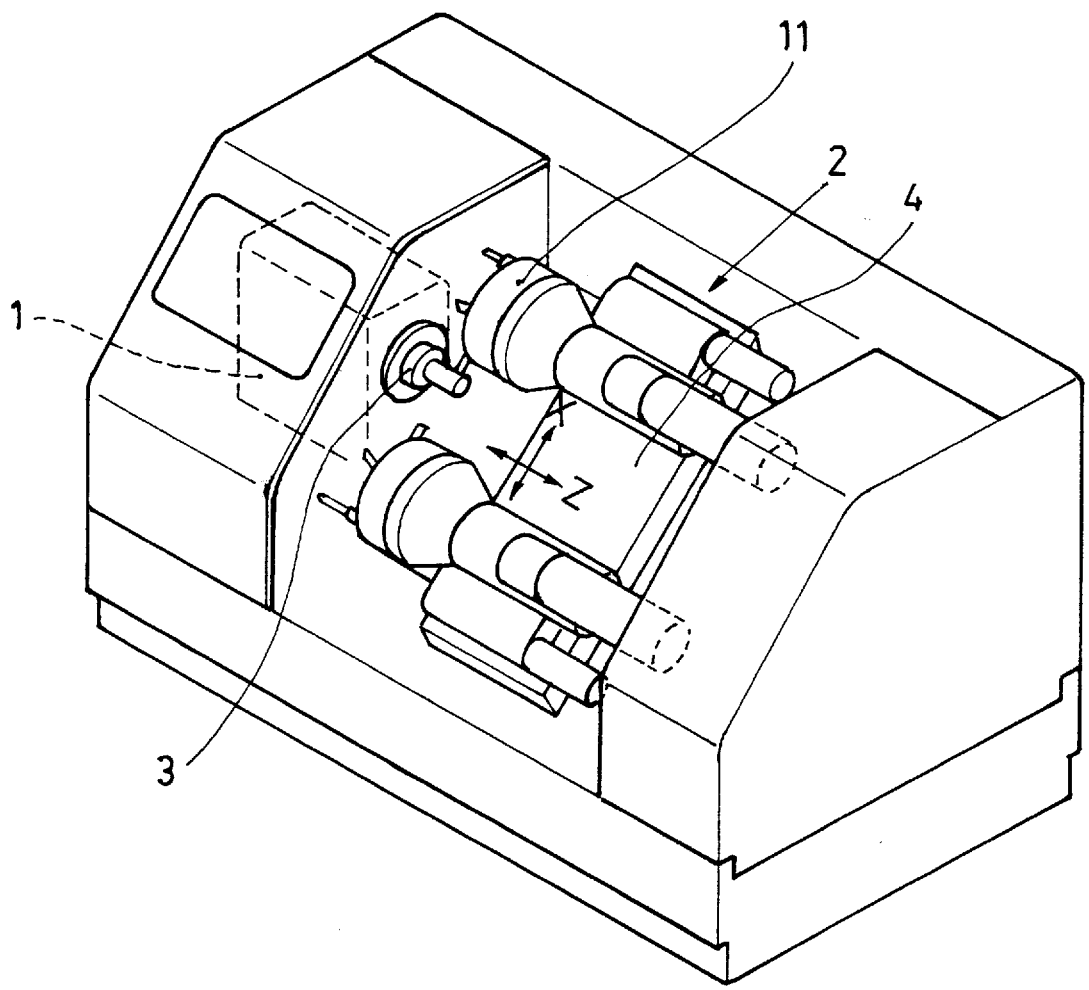

INDEXING DEVICE AND METHOD OF DRIVING THE SAME

TECHNICAL FIELD

The present invention relates to an indexing device which is structured such that a rotary table is indexed while rotated about a given rotary center relative to a base table, and to a method of driving the same, such as for example, an indexing device adapted for a turret device used by a lathe, and a method of driving the same.

BACKGROUND TECHNOLOGY

There has been recently an increasing demand for an NC lathe provided with a turret device since a machining apparatus, particularly, a lathe is able to realize automatic machining operations at high speed and can cope with a computer-integrated flexible manufacturing system.

The turret device is structured such that a rotary table called a turret which is provided on a tab base table (tool slide), and has normally 5 to 12 indexing positions, is indexed while rotated (hereinafter referred to as simply indexed). Tool mounting portions are formed on an outer periphery or end surface of the turret, and various tools such as turning tools and drills are mounted on these tool mounting portions wherein an appropriate tool is selected from the various tools depending on the type of machining process desired so as to index the selected tools in machining positions.

In indexing devices such as the turret, a pair of positioning engaging members which are engageable with and disengageable from each other are provided so that the selected tool is indexing in a given indexing position, and the tool which was arranged in the indexing position is positioned and fixed to the indexing position.

This pair of positioning engaging members is provided between the base table and a turret, wherein the turret may be freely indexing or may be positioned and fixed to a given indexing position when the positioning engaging members engage with or disengage from each other.

In the turret device of the NC lathe, crown gears such as curvic couplings which mesh with each other are generally employed as the positioning engaging members. In the positioning engaging member of this type, when a turret side coupling is moved in the axial direction relative to a base table side coupling, the engagement and disengagement between these couplings is performed.

The engaging and disengaging operations of the positioning engaging members, namely the driving of the turret side coupling in the axial direction, has been carried out by a hydraulic or pneumatic actuator.

However, the hydraulic or pneumatic actuator requires oil under high pressure or compressed air as an operating medium, and hence it requires a power unit including an accumulator, a pump and a tank. Meanwhile, a servomotor capable of controlling with high accuracy and fast response has been frequently used as a driving source for driving each component of a recent machining apparatus such as an NC lathe, and hence the holding and releasing of a workpiece by a chuck and the indexing of the turret, which have been carried out by a hydraulic system, are now frequently carried out by the servomotor.

Accordingly, the conventional indexing device provided with a hydraulic or pneumatic actuator for carrying out only the engagement and disengagement between the positioning engaging members such as curvic couplings incurs high costs in terms of facilities therefor, such as power units and piping, etc., which causes a problem that the apparatus is uneconomical and becomes large-sized because of the provision of the power unit, and it also becomes a source of noise.

Further, when the positioning engaging members engage with each other using a hydraulic or pneumatic actuator, there are drawbacks in that they are cracked or chipped by the shock which is generated when a pair of positioning engaging members strike against each other, and the accuracy thereof is deteriorated owing to the friction therebetween.

Still further, when the hydraulic or pneumatic actuator is used for engagement and disengagement between the positioning engaging members, a sensor for confirming the completion of the operation of the actuator is required. Accordingly, the apparatus is further complex in structure, and troublesome operation such as attachment and adjustment of the sensor is required, and the controlling operation requires time for detection by the sensor, thereby causing a problem that fast control can not be performed.

The present invention aims to realize the engagement and disengagement between the positioning engaging members for indexing a rotary table and positioning and fixing the rotary table to a given indexing position by driving the motor, thereby reducing facility costs and making the apparatus small-sized, and makes it possible to operate the indexing device with less shock and to perform easy and fast control at high speed by controlling the rotating speed of the motor.

DISCLOSURE OF THE INVENTION

To achieve the above object, the present invention has the following structure in an indexing device provided with a rotary table for indexing the rotary table about a given rotary center relative to a base table:

(a) a pair of positioning engaging members which are engageable with and disengageable from each other between the base table and the rotary table and which prevent the rotary table from rotating when they engage with each other;

(b) a screw feed mechanism comprising a screw provided on a rotary center of the rotary table and a nut screwed onto the screw, wherein when the screw or nut turns, the nut or screw moves linearly relative to the screw or nut along an axis of the screw so as to permit the positioning engaging members to engage with or disengage from each other;

(c) a first motor for turning and driving one of the screw or nut;

(d) a second motor for indexing the rotary table; and, (e) a control means for rotating the first motor in a given rotating direction with a given ratio of rotating speed relative to the rotation of the second motor when the second motor is driven for indexing the rotary table.

According to the structure of the present invention set forth above, the engagement and disengagement between the positioning engaging members for indexing the rotary table or for positioning and fixing the rotary table to a given indexing position are performed by the first motor.

That is, when the first motor rotates, a rotary driving force thereof (hereinafter simply referred to as a driving force) is transmitted to the screw (or nut) of the screw feed mechanism, by which the turning of the screw (or nut) is changed to a linear motion of the nut (or screw).

As the nut (or screw) linearly moves, the relative movement occurs between a pair of positioning engaging members in the axial direction so that the engagement and disengagement between the positioning engaging members are carried out, whereby the rotary table is indexed or it is positioned and fixed to a given indexing position.

When the driving force of the first motor is transmitted to the positioning engaging members via the screw feed mechanism, the positioning engaging members engage with or disengage from each other, thereby allowing the facility costs to be reduced and making the apparatus small-sized compared with a conventional indexing device using a hydraulic or pneumatic actuator as a driving source, and also thereby realizing a smooth engagement between the positioning engaging members with less shock.

Further, it is not necessary to separately provide a sensor since the engagement and disengagement between the positioning and engaging members can be discriminated by controlling the position or driving force of the first motor.

Meanwhile, the rotary table is indexed by the driving force of the second motor which is provided separately from the first motor. When the rotary table is indexing, the driving force transmitted from the second motor to the rotary table applies the relative turning motion to the screw feed mechanism via the rotary table. That is, the nut (or screw) is turned by the driving force of the second motor so that the nut (or screw) turns relative to the screw (or nut) which is connected to the first motor so as to linearly move the positioning engaging members at the side of the rotary table.

In such a manner, when the positioning engaging members at the side of the rotary table move linearly in the axial direction, the positioning engaging members which ought to disengage from each other engage with each other so that the indexing of the turret is locked, or the rotary table is moved far away from and can skip or leap over the base table, thereby causing a problem that the tools interfere with surrounding components.

Accordingly, in the present invention, the first motor is rotated by the control means relative to the rotation of the second motor in a given rotating direction with a given ratio of rotating speed (ratio of rotating speed not to cause the relative turning between the screw and nut of the screw feed mechanism) when the second motor is driven to index the rotary table, thereby making the relative turning between the screw and the nut of the screw feed mechanism zero so as to prevent the positioning engaging members from linearly moving by the screw feed mechanism.

Further, according to the present invention, a clutch member may be provided between the second motor and rotary table. The clutch member is interlocked with the engagement and disengagement between the positioning engaging members mechanically or under the control thereof, thereby permitting the second motor and rotary table to engage with each other when the positioning engaging members disengage from each other. On the other hand, the second motor and rotary table disengage from each other when the positioning engaging members engage with each other.

With the provision of such a clutch member, it is possible to prevent the driving force of the second motor from being transmitted to the rotary table even if the second motor rotates while the rotary table is positioned and fixed to the arbitrary indexing position. As a result, the second motor can be used for purposes other than the indexing of the rotary table, for example, for rotatably driving (hereinafter refereed to as simply driving) rotary tools, such as a drill.

Still further, the present invention provides a method of driving an indexing device comprising a base table, a rotary table which is indexed about a given rotary center relative to the base table, a pair of positioning engaging members which are engageable with and disengageable from each other between the base table and rotary table for preventing the rotary table from rotating when they engage with each other, a screw feed mechanism comprising a screw provided on a rotary center of the rotary table and a nut screwed onto the screw for permitting the positioning engaging members to engage with or disengage from each other, a first motor for driving the screw feed mechanism and a second motor for indexing the rotary table.

That is, the method of driving the indexing device comprises driving the screw feed mechanism by the rotation of the first motor in the direction for releasing the engagement between the positioning engaging members, and driving the second motor to index the rotary table after the engagement between the positioning engaging members has been released and rotating the first motor relative to the rotation of the second motor in a given rotating direction with a given ratio of rotating speed so as not to change the relative position between the screw and nut of the screw feed mechanism.

According to the method of driving the indexing device, the engagement and disengagement between the positioning engaging members can be performed by the first motor, thereby preventing linear motion of the positioning engaging members at the rotary table side in the axial direction thereof which is caused by the driving force being transmitted from the second motor via the rotary table.

BRIEF DESCRIPTION OF DRAWINGS

FIG. 1 is a perspective view showing an external configuration of a turret NC lathe;

BEST MODE FOR CARRYING OUT THE INVENTION

Figure 2:
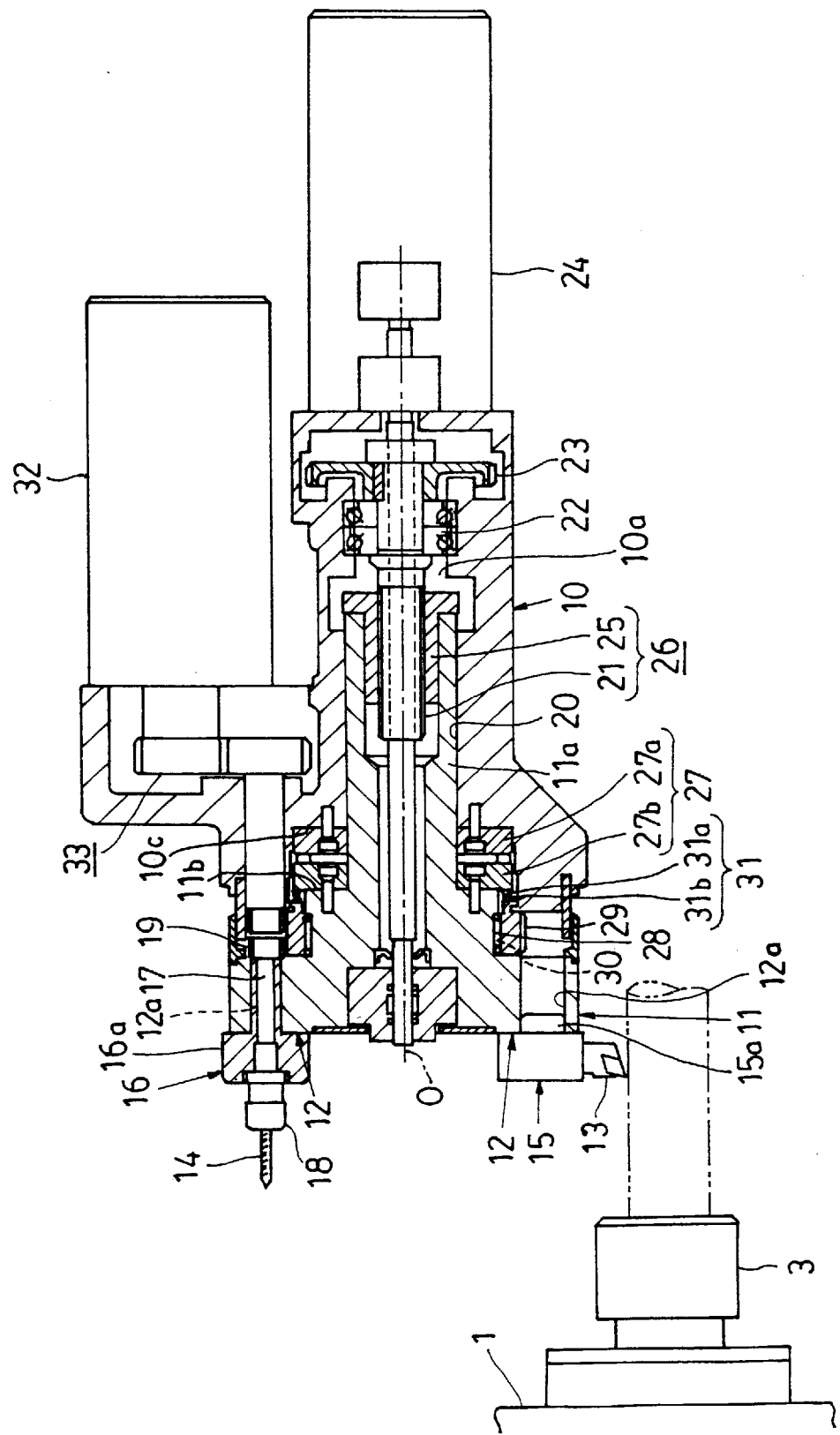
FIG. 2 is a sectional plan view of a turret device to which an indexing device of the invention is applied.

An indexing device applied to a turret device of a turret NC lathe according to a preferred embodiment of the invention will be now described in detail with reference to the attached drawings.

FIG. 1 is a perspective view showing an external configuration of the turret NC lathe. As shown in the same figure, the turret NC lathe comprises a headstock 1 and a turret device 2. The headstock 1 has a chuck 3 mounted thereon for holding a workpiece, and the headstock 1 serves to rotate the workpiece held by the chuck 3 by a main spindle motor (not shown) incorporated therein.

Various tools necessary for a cutting processes can be mounted on the turret device 2, and a turret 11 (two turrets 11 with the workpiece interposed therebetween in FIG. 1) is provided on the turret device 2 for appropriately selecting the tool and cutting the workpiece held by the chuck 3 of the headstock 1. The cutting process can be performed by moving a tool slide 4 provided on the turret device 2 in the direction of a main spindle center line (Z axis) and in the direction of an X axis which crosses at right angles with the main spindle center line.

FIG. 2 is a sectional plan view of the turret device to which the indexing device of the invention is applied.

The turret device 2 comprises a base table 10 provided on the tool slide 4 and a turret (rotary table) 11 which is rotatably mounted on the base table 10. The tool slide 4 is driven in the directions of the Z and X axes by a tool slide driving apparatus, not shown.

A plurality of tool mounting portions 12 are provided on a front end outer peripheral edge of the turret 11 with given indexing angles. A cutting tool 13 such as a turning tool secured to a tool holder 15 and a rotary tool 14 such as a drill secured to another tool holder 16 can be mounted on the tool mounting portions 12.

The tool holder 15 of the cutting tool 13 can be firmly fixed to the tool mounting portion 12 such that a protrusion 15a formed on the tool holder 15 is inserted into and positioned in a mounting hole 12A defined in the tool mounting portion 12, and they are firmly fixed to each other by a fastening device such as a bolt, not shown.

The tool holder 16 of the rotary tool 14 has a rotatable tool rotary shaft 17 which penetrates the center of a holder body 16a, and a tool chuck 18 for holding the rotary tool 14 is provided at the tip end of the tool rotary shaft 17. Further, a tool rotary gear 19 is provided at the base end of the tool rotary shaft 17.

The tool holder 16 of the rotary tool 14 is firmly fixed to the tool mounting portion 12 such that the holder body 16a is inserted into the mounting hole 12a which is bored in the tool mounting portion 12 of the turret 11, and they are firmly fixed to each other by a fastening device such as a bolt, not shown. At this time, the tool rotary gear 19 provided at the base end of the tool rotary shaft 17 penetrates the turret 11 and protrudes backward.

The tool mounting portions 12 of the turret 11 and the tools may be structured in the same manner as the known turret and mounting tools which are applied to machine tools in addition to the aforementioned structure.

A base end portion 11a formed in the small diameter part of the turret 11 is rotatable about a rotary center O via a slide bearing 20 formed in a hollow part 10a of the base table 10, and it is mounted on the base table 10 to be movable linearly along the rotary center O.

A ball screw 21 is provided in the hollow part 10a of the base table 10 coaxially with the rotary center O via a rolling bearing 22. A motive transmission gear 23 is secured to the base end of the ball screw 21.

A first motor 24 comprising of a servomotor is mounted on the base table 10. A driving gear, not shown, meshing with the motive transmission gear 23 is secured to the rotary shaft of the first motor 24, wherein the driving force of the first motor 24 is transmitted to the ball screw 21 via the driving gear and the motive transmission gear 23 so as to drive and turn the ball screw 21.

A nut 25 is screwed into the ball screw 21, and it is fixed to the base end portion 11a of the turret 11. Accordingly, the nut 25 moves linearly along the rotary center O as the ball screw 21 turns so that the turret 11 moves linearly along the rotary center O together with the nut 25. That is, the ball screw 21 and nut 25 structure or comprise a screw feed mechanism 26 for linearly moving the turret 11.

Further, the turret 11 has an annular gear 29 which is mounted coaxially to the rotary center O via a needle bearing 28. A gear meshing with the tool rotary gear 19 of the tool rotary shaft 17 and also with a gear for transmitting the driving force of a second motor 32, described later, is formed on the outer peripheral surface of the annular gear 29, and the inner peripheral surface of the annular gear 29 is rotatably supported by the needle bearing 28.

A recess 30 defined in the outer peripheral surface of the turret 11 serves as an inner ring of the needle bearing 28 so that the needle bearing 28 can be rotated relative to the turret 11 but is prevented from moving in the direction of the rotary center O. Accordingly, the needle bearing 28 moves together with the turret 11 in the same direction when the turret 11 moves linearly along the rotary center O.

Figure 3:
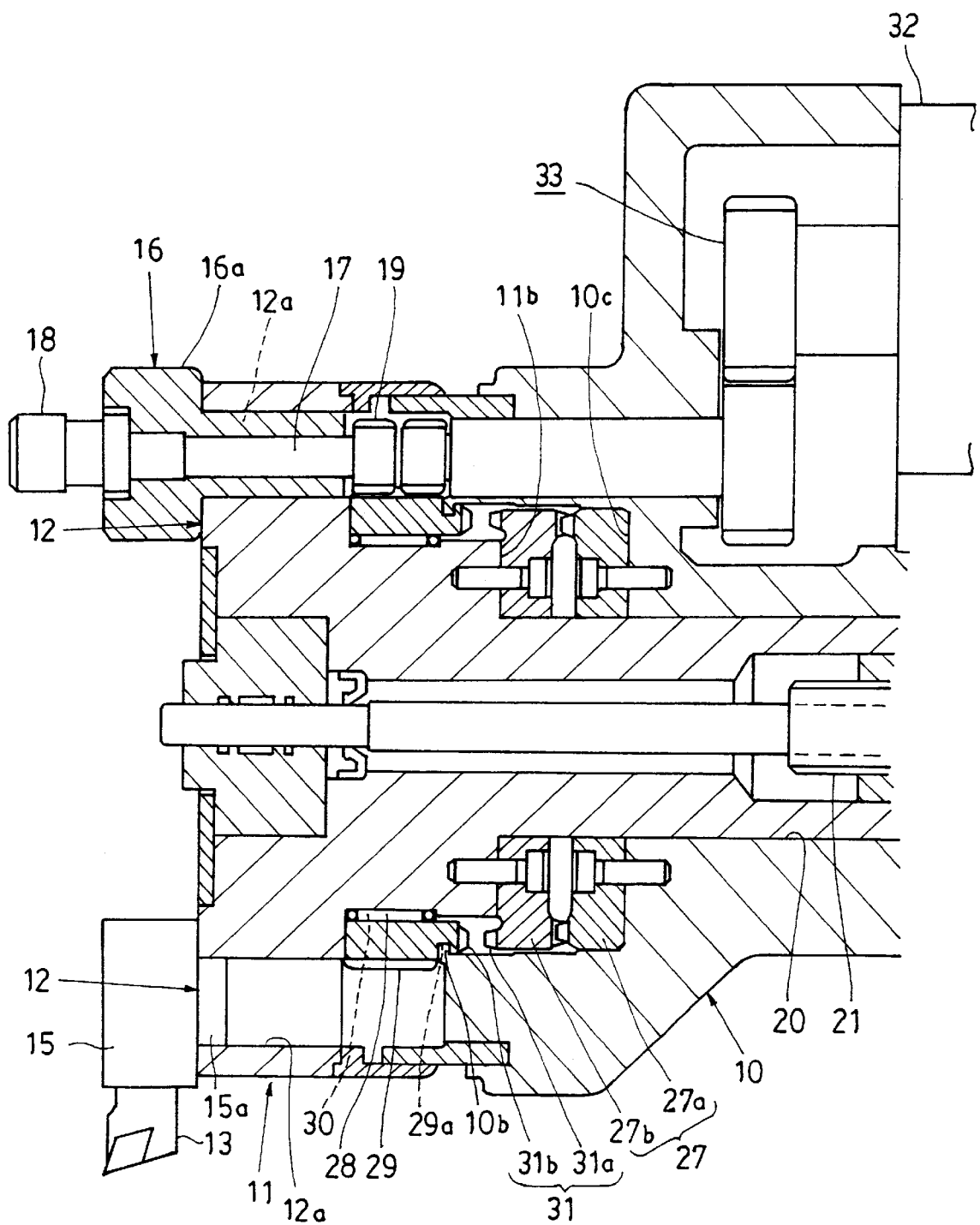
FIG. 3 is an enlarged sectional plan view showing a state where positioning engaging members engage with each other and clutch pieces disengage from each other.
Figure 4:
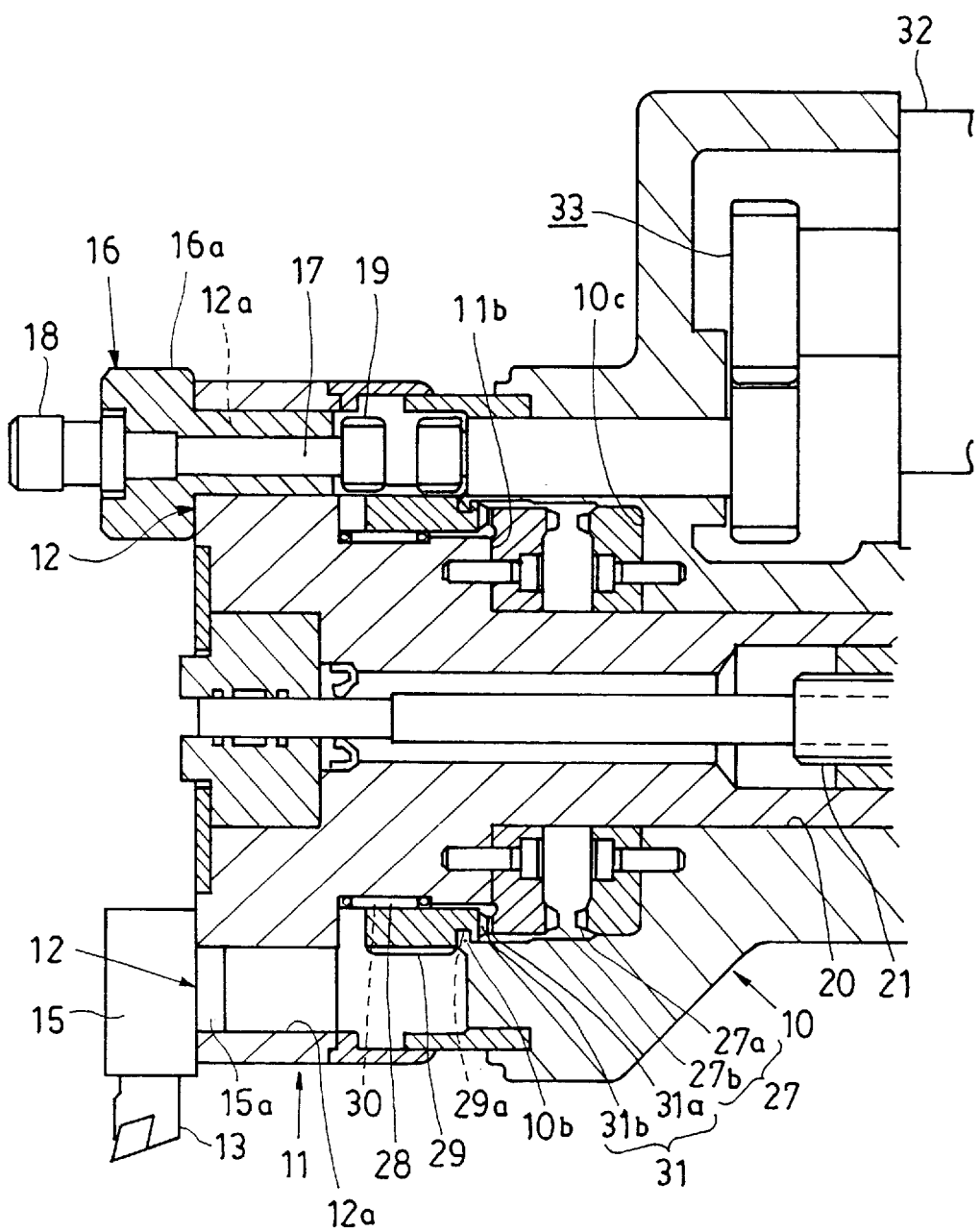
FIG. 4 is an enlarged sectional plan view showing a state where the positioning engaging members disengage from each other and the clutch pieces engage with each other.

The annular gear 29 is structured, as shown largely in FIGS. 3 and 4, so that a circumferential groove 29a defined in the rear end thereof engages with a protrusion 10b formed on the base table 10, wherein the annular gear 29 is held in a given position by the engagement between the groove 29a and protrusion 10b.

The hollow part 10a of the base table 10 has a large diameter part at the tip end side demarcating a stepped part 10c while the turret 11 has a large diameter part at the tip end side thereof demarcating a stepped part 11b. The stepped part 10c of the base table 10 and stepped part 11b of the turret 11 are provided with the positioning engaging member 27 at the surfaces thereof comprising a base table side coupling 27a and a turret side coupling 27b to form a curvic coupling.

Figure 7A:
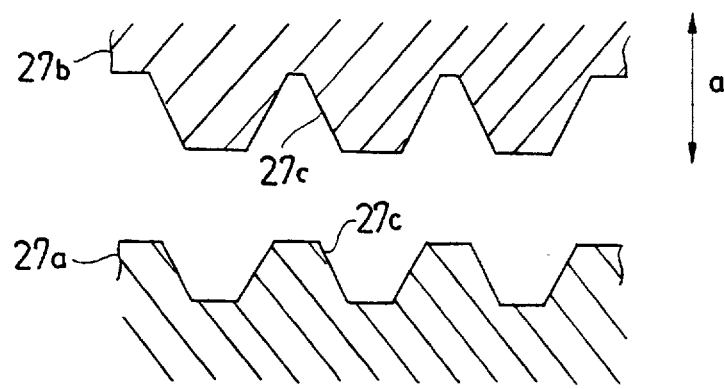
FIG. 7A is a sectional view of the positioning engaging members according to a preferred embodiment of the invention wherein tooth profiles thereof are enlarged.
Figure 7B:
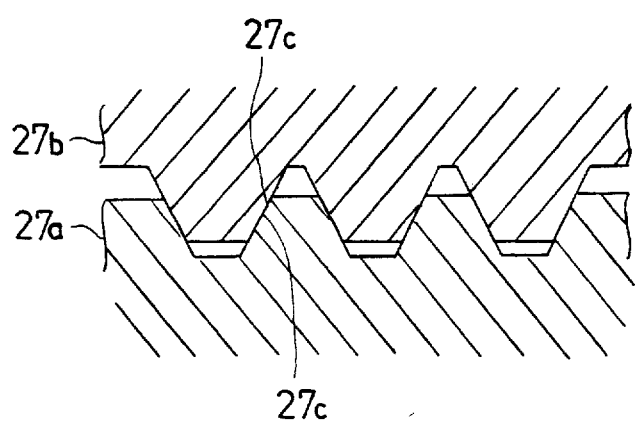
FIG. 7B is a sectional view of the positioning engaging members which engage with each other wherein tooth profiles thereof are enlarged.

The couplings 27a and 27b are positioned with tooth profiles formed like a known crown gear meshing with each other, and they have inclined tooth profiles 27c respectively formed with given pitches as shown in FIGS. 7A and 7B. When the turret 11 moves linearly, the turret side coupling 27b fixed to the turret 11 moves in a direction denoted by a, tooth profiles 27c of the base table side coupling 27a and those of the turret side coupling 27b engage with each other or disengage from each other.

Clutch pieces 31a and 31b constituting a clutch member 31 are respectively formed at the rear end edge of the annular gear 29 and at the front surface of the turret side coupling 27b of the positioning engaging member 27 provided on the turret 11 so as to oppose each other. Inclined tooth profiles are formed on the surfaces of the clutch pieces 31a and 31b opposing each other with given pitches like those of the couplings 27a and 27b. These tooth profiles engage with or disengage from each other when the turret 11 moves linearly along the rotary center O.

The engagement and disengagement between clutch pieces 31a and 31b and between the couplings 27a and 27b have an opposite relationship. That is, when the turret 11 moves rightward relative to the base table 10 in FIG. 2, the couplings 27a and 27b engage with each other while clutch pieces 31a and 31b disengage from each other.

FIG. 3 is an enlarged view showing a state where the couplings 27a and 27b of the positioning engaging member 27 engage with each other to prevent the rotation of the turret 11 and the clutch pieces 31a and 31b of the clutch member 31 disengage from each other.

Since the turret 11 is prevented from rotating by the engagement between the couplings 27a and 27b in the state shown in the same figure, it cannot be indexed. When the turret 11 moves leftward relative to the base table 10 by the turning of the ball screw 21 as shown in FIG. 2, the couplings 27a and 27b disengage from each other, then the clutch pieces 31a and 31b engage with each other.

FIG. 4 is an enlarged view showing a state where the couplings 27a and 27b disengage from each other and the clutch pieces 31a and 31b engage with each other.

As shown in the same figure, the tool rotary gear 19 provided on the tool holder 16 of the rotary tool which is mounted on the tool mounting portion 12 of the turret 11 meshes with the annular gear 29.

The second motor 32 comprising a servomotor is mounted on the base table 10, and the driving force of the second motor 32 is transmitted to the annular gear 29 via a gear mechanism 33 so as to rotate the annular gear 29.

Accordingly, the second motor 32 rotates the annular gear 29 via the gear mechanism 33 in the state shown in FIG. 3 so that only the tool rotary shaft 17 provided on the tool holder 16 is rotated by the rotation of the annular gear 29 to drive and turn the rotary tool 14. Meanwhile, in the state shown in FIG. 4 where the couplings 27a and 27b disengage from each other and the clutch pieces 31a and 31b engage with each other, the rotation of the annular gear 29 is transmitted to the turret side coupling 27b fixed to the turret 11 so that the second motor 32 indexes the turret 11.

Figure 5:
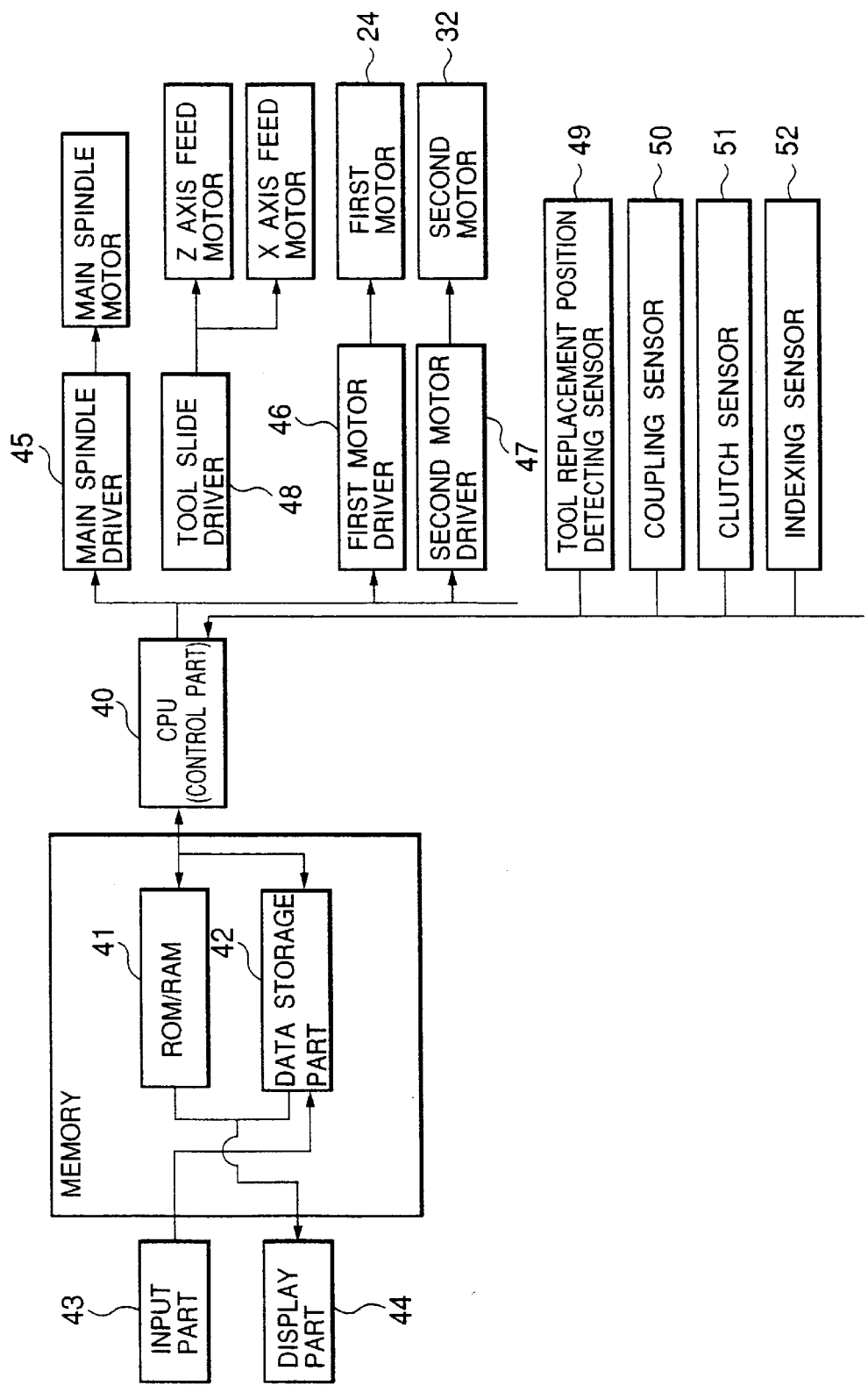
FIG. 5 is a block diagram showing a control system of the turret device.

FIG. 5 is a block diagram showing a control system of the aforementioned turret device 2.

As shown in the same figure, the control system of the turret device 2 includes a control part (CPU) 40, a ROM/RAM 41, a data storage part 42, an input part 43, a display part 44, a main spindle driver 45, a first motor driver 46, a second motor driver 47, a tool slide driver 48, a tool replacement position detecting sensor 49, a coupling sensor 50, a clutch sensor 51, an indexing sensor 52, etc.

A control program for driving the turret device 2 is stored in advance in the ROM/RAM 41. The control part 40 controls each component of the turret device 2 based on the control program. The input part 43 comprises a keyboard, etc., and data necessary for controlling each component of the turret device 2 (selection of tools, shapes and dimensions of the workpiece to be machined, rotating speed of the main spindle, feeding speed of tools, etc.) are inputted through the input part 43. This data can be inputted by entering numerical values on a drawing displayed on the display part 44 on an interactive basis.

Data inputted from the input part 43 and various data necessary for driving and controlling the turret device 2 are respectively stored in the storage part 42.

The control part 40 outputs a given command based on the control program stored in the ROM/RAM 41, on the selection of tools (indexing of the turret) as stored in the data storage part 42, and on machining data.

The main spindle driver 45 drives a main spindle motor based on commands issued from the control part 40 to rotate the workpiece held by the chuck 3 of the headstock 1. The workpiece is machined by the movement of the tool slide 4 in the directions of the Z and X axes and by rotation of the rotary tool 14 by the second motor 32, if necessary.

The tool slide driver 48 drives the feed motor in the directions of the Z and X axes based on commands issued from the control part 40 to drive the tool slide 4 of the turret device 2 in the directions of the Z and X axes.

The first motor driver 46 drives the first motor 24 based on a command issued from the control part 40 so as to permit the couplings 27a and 27b to engage with and disengage from each other and to permit the clutch pieces 31a and 31b to engage with and disengage from each other for positioning and fixing the turret 11.

The second motor driver 47 drives the second motor 32 based on a command issued from the control part 40 so as to execute the indexing of the turret 11 or rotary driving of the rotary tool 14. The rotary driving of the rotary tool 14 is carried out when the workpiece is machined while the indexing of the turret 11 is carried out when the tools are selected before or after the workpiece is machined.

The tool replacement position detecting sensor 49 detects whether the turret device 2 is positioned in a tool replacement position (i.e., a given backward position, namely, tool origin of the tool slide 4 where the turret 11 can be indexed) or not based on the coordinate showing the present position of the tool slide 4.

The coupling sensor 50 monitors the engagement and disengagement between the couplings 27a and 27b, and detects the increase of rotary torque and outputs a coupling completion signal to the control part 40 upon completion of engagement between the couplings 27a and 27b. The clutch sensor 51 monitors the engagement and disengagement between the clutch pieces 31a and 31b, and outputs a clutch completion signal to the control part 40 when they engage with each other. The indexing sensor 52 monitors the rotary angle when the turret 11 is indexing, and outputs an indexing completion signal to the control part 40 when the indexing operation is completed at the angular position which is issued by the control part 40.

As mentioned above, since these sensors 49 to 52 are structured to operate when detecting the rotary position of the servomotor or the variation of the rotary torque, a special sensor need not be provided.

Figure 6:
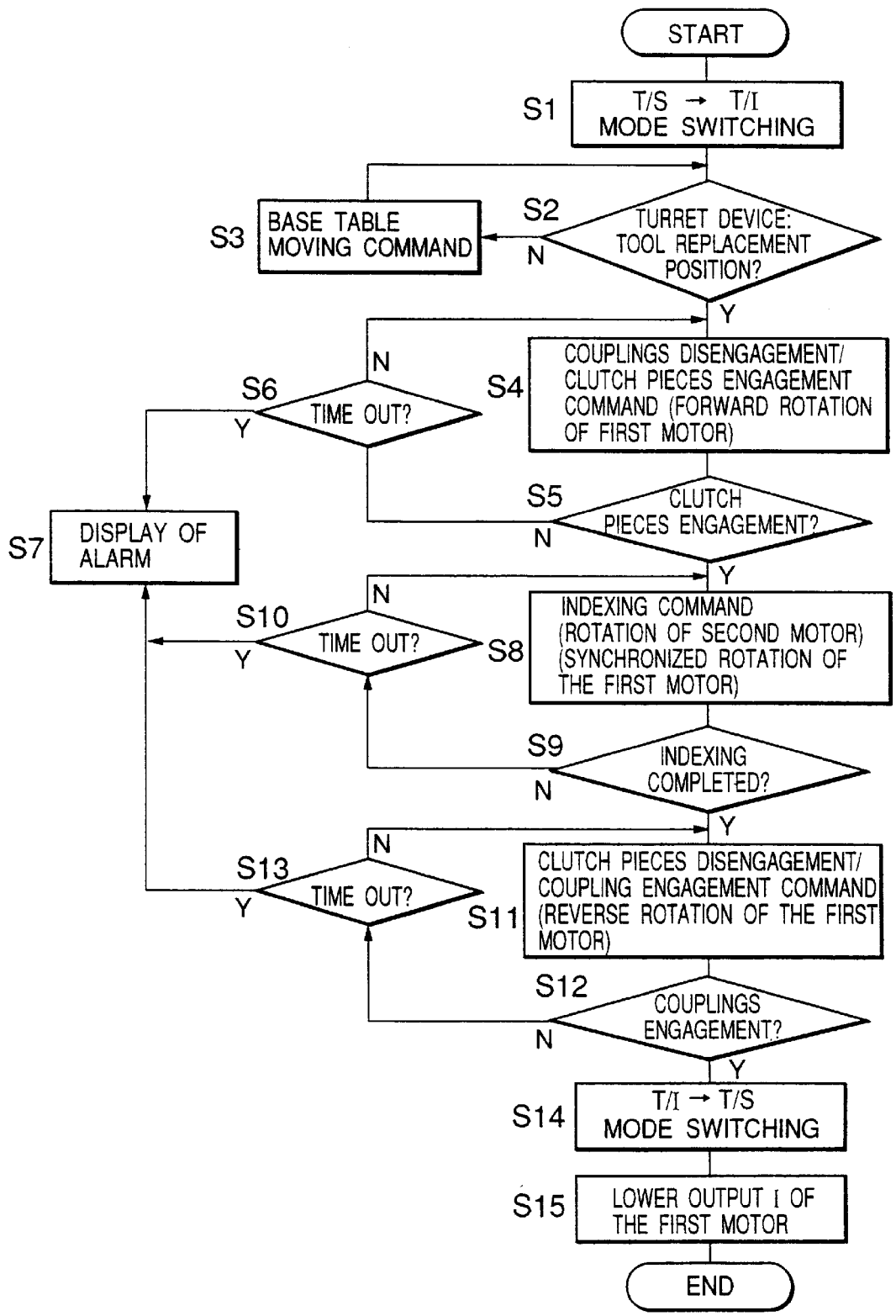
FIG. 6 is a flow chart showing a control operation of the turret device according to the control system in FIG. 5.

FIG. 6 is a flow chart showing a control operation for executing the indexing, positioning and fixation of the turret 11 (rotary table) of the turret device 2 (indexing device), and the rotary driving of the rotary tool 14 based on the control system having the structure set forth above. The control operation is executed mainly by the commands issued from the control part 40. Accordingly, the control operation set forth hereunder will be explained mainly with reference to the commands issued from the control part 40.

In the aforementioned turret device 2, the second motor 32 serves as a driving source for executing the indexing of the turret 11 and rotary driving of the rotary tool 14. Since the rotating speed and rotating direction of the second motor 32 are differentiated depending on the objects to be driven thereby, the control of the second motor 32 is divided into a mode (T/I mode) for indexing the turret 11 and another mode (T/S mode) for rotary driving the rotary tool 14, wherein control programs corresponding to each mode are stored in the ROM/RAM 41.

First, when the process for indexing the turret 11 is executed for selecting a succeeding tool upon completion of the cutting process, the control part 40 starts the indexing of the turret 11 upon confirmation of the completion of the cutting process, then switches the control program of the second motor 32 to the T/I mode (S1), and successively confirms whether the turret device 2 is positioned or not at present at the tool origin (a tool replacement position where the turret device 2 is rotated) (S2) in response to a signal issued from the tool replacement position detecting sensor 49. If the turret device 2 is not positioned at the tool origin, the control part 40 outputs a moving command signal to the tool slide driver 48 (S3), and then moves the tool slide 4 of the turret device 2 to the tool origin.

Upon confirmation that the turret device 2 is positioned at the tool origin, the control part 40 issues a driving command to the first motor driver 46 to drive the first motor 24 in the forward direction (S4). In this embodiment, a rotating direction of the first motor 24 for moving the nut 25 of the screw feed mechanism 26 in the forward direction (leftward in FIG. 2) is defined as the forward direction.

When the first motor 24 rotates in the forward direction, the driving force of the first motor 24 is transmitted to the ball screw 21 of the screw feed mechanism 26 via the motive transmission gear 23 shown in FIG. 2 so that the ball screw 21 turns. As the ball screw 21 turns, the nut 25 moves forward linearly (leftward) along the rotary center O.

Since the turret 11 is fixed to the nut 25, the turret 11 also moves forward linearly together with the nut 25. As a result, the couplings 27a and 27b of the positioning engaging member 27 provided between the base table 10 and turret 11 disengage from each other so that the turret 11 is rotatable.

At this time, the friction between the ball screw 21 and nut 25 of the screw feed mechanism 26 is sufficiently small compared with that between the base end portion 11a of the turret 11 and slide bearing 20 of the base table 10, so that the turret 11 does not rotate but moves forward linearly.

When the first motor 24 continues to rotate in the forward direction, clutch pieces 31a and 31b of the clutch member 31 engage with each other. In such a manner, upon completion of the engagement between the clutch pieces 31a and 31b, the rotary torque of the first motor 24 increases sharply so that a clutch completion signal is outputted from the clutch sensor 51 (S5).

Since the control part 40 has a timer function, it measures time counting from the time of issuance of the driving command to the first motor driver 46 (S6), and it decides that the apparatus is anomalous when the clutch completion signal is not inputted therein even if a given time elapses, then it stops the operation of the turret device 2, then indicates an alarm (S7).

Meanwhile, when the clutch completion signal is inputted within a given time, the control part 40 stops the rotation of the first motor 24, then issues a driving command to the second motor driver 47 (88), thereby rotating the second motor 32 in the rotating direction and rotating angle which are determined by the present tool fixing position and the tool fixing position to be selected next. The driving force of the second motor 32 is transmitted to the turret 11 by way of the gear mechanism 33, annular gear 29, and clutch pieces 31a and 31b. Based on this driving force, the turret 11 is indexed to the tool fixing position to be selected next.

Meanwhile, when the turret 11 is indexing by the driving force of the second motor 32, the nut 25 of the screw feed mechanism 26 fixed to the turret 11 is turned together with the turret 11. When the relative turning occurs between the nut 25 and ball screw 21, the ball screw 21 moves relatively linearly along the rotary center O by the relative turning of the nut 25. However, the ball screw 21 is prevented from moving in the direction of the rotary center O by the rolling bearing 22. As a result, the nut 25 moves and the turret 11 moves in the direction of the rotary center O.

When the turret 11 moves rightward by the screw feed mechanism 26, the turret side coupling 27b interferes with the base table side coupling 27a while it rotates so that the second motor 32 does not rotate, while when the turret 11 moves leftward, the clutch piece 31a is strongly pressed against the clutch piece 31b which engages with the clutch piece 31a so that the second motor 32 does not rotate.

Accordingly, in the preferred embodiment, the first motor 24 rotates in a given rotating direction with a given ratio of rotating speed so as not to rotate the ball screw 21 and nut 25 of the screw feed mechanism 26 relative to each other in synchronization with the rotation of the second motor 32 for indexing the turret 11.

The ratio of rotating speed and rotating direction between the second motor 32 and first motor 24 are respectively determined by the ratio of a train of gears and rotating direction of gears extending from the second motor 32 to annular gear 29 (turret 11) and those extending from the first motor 24 to ball screw 21, and by a control program stored in the ROM/RAM 41.

When the indexing of the turret 11 is completed in such a manner, the control part 40 detects the rotating position of the second motor 32 so that an indexing completion signal is issued from the indexing sensor 52 (S9).

The control part 40 measures time counting from the time of issuance of the driving command to the second motor driver 47 (S10), and it decides that the apparatus is anomalous when the clutch completion signal is not inputted therein even if a given time elapses, then it stops the operation of the turret device 2, then indicates an alarm (S7).

Meanwhile, when the indexing completion signal is inputted within a given time, the control part 40 stops the rotation of the second motor 32, then issues the driving command to the first motor driver 46 to rotate the first motor 24 in an opposite direction (S11).

When the first motor 24 rotates in the opposite direction, the driving force of the first motor 24 is transmitted to the ball screw 21 of the screw feed mechanism 26 via the motive transmission gear 23 shown in FIG. 2 to turn the ball screw 21 in the opposite direction. As the ball screw 21 turns in the opposite direction, the nut 25 and turret 11 move backward (rightward in FIG. 2) linearly along the rotary center O. As a result, the clutch pieces 31a and 31b disengage from each other.

When the first motor 24 continues to rotate in the opposite direction, the couplings 27a and 27b engage with each other as shown in FIG. 3. Upon completion of the engagement between the couplings 27a and 27b, the rotary torque of the second motor 32 increases sharply so that the coupling completion signal is issued from the coupling sensor 50 (S12).

The control part 40 measures time counting from the time of issuance of the reverse rotation driving command to the first motor driver 46 (S13), and it judges that the apparatus is anomalous and stops the operation of the turret device 2, then indicates an alarm when the coupling completion signal is not inputted even if a given time elapses (S7).

Meanwhile, since the selection of the next tool is completed when the coupling completion signal is inputted within a given time, the control part 40 switches the control mode of the succeeding second motor 32 to the rotary driving mode (T/S mode) of the rotary tool 14 (S14) and lowers the output torque of the first motor 24 (S15). The output torque of the first motor 24 is applied between the couplings 27a and 27b via the screw feed mechanism 26, and it is decreased to a torque (holding torque) for sufficiently keeping the engagement between the couplings 27a and 27b. According to the preferred embodiment, since the couplings 27a and 27b comprise curvic couplings, and the linear motion of the turret 11 is performed by the screw feed mechanism 26, the holding torque can be reduced to a sufficiently small torque.

With the operations set forth above, a series of operations for tool replacement is completed, and thereafter the cutting process is carried out.

Figure 8:
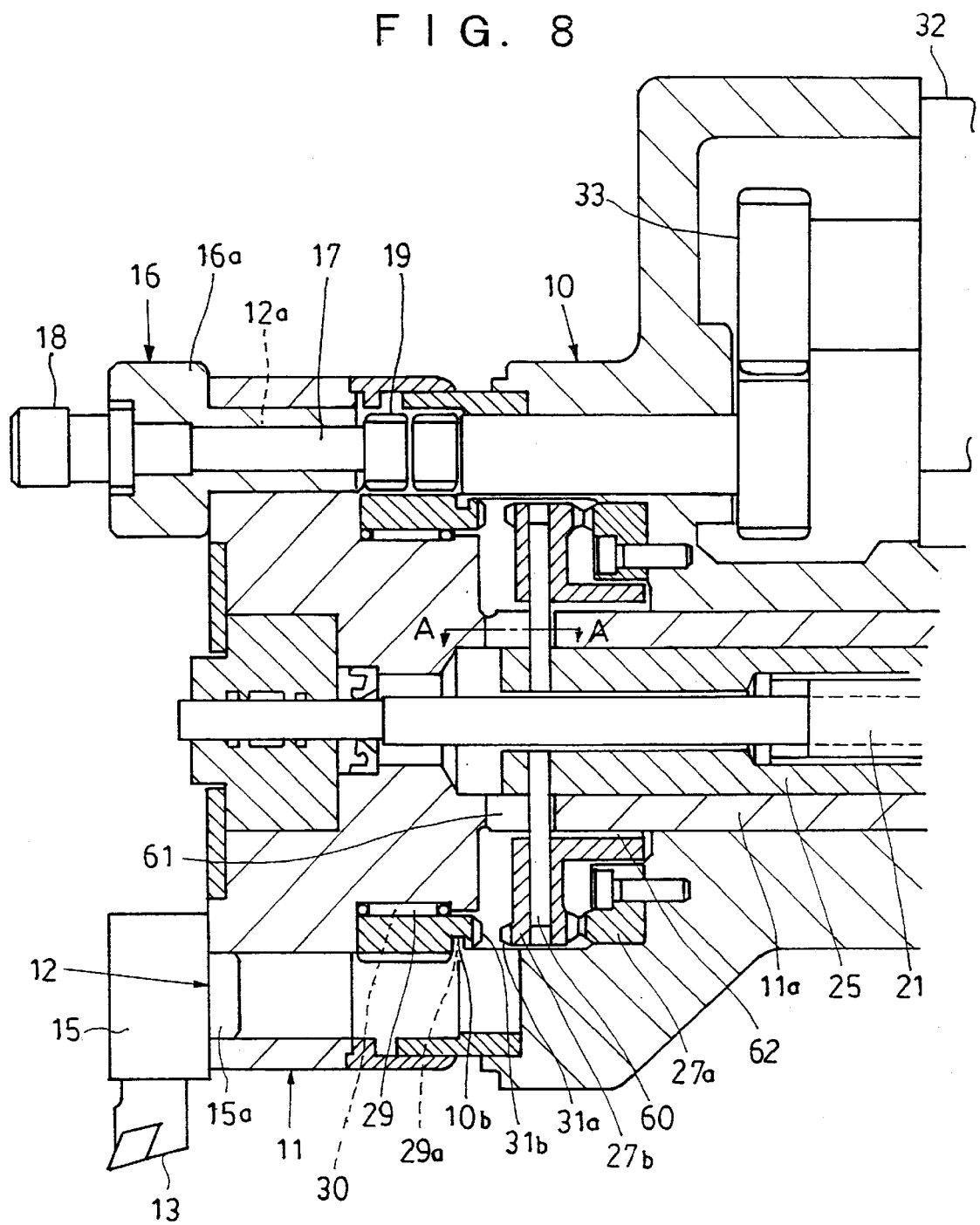
FIG. 8 is a sectional plan view of an indexing device which is applied to a turret device of a turret NC lathe according to another embodiment of the invention; and, FIG. 9 is a sectional view taken along the line A—A in FIG. 8.

FIG. 8 is a sectional plan view of an indexing device which is applied to a turret device of a turret NC lathe according to another embodiment of the invention. Components which are the same as or corresponding to those as shown in FIGS. 2 to 4 are denoted by the same numerals and the detailed explanation thereof is omitted.

In the turret device shown in the same figure, the turret 11 is secured to the base table 10 to be only rotatable about the base table 10, and turret 11 can only be indexed about the rotary center O. In the preferred embodiment as shown in FIGS. 2 to 4, the tip end of the nut 25 of the screw feed mechanism 26 penetrates the base end portion 11a of the turret 11 to extend to a region where the turret side coupling 27b moves in the axial direction.

Figure 9:
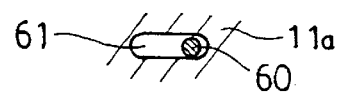

A driving pin 60 (two in FIG. 8) is secured to the tip end of the nut 25 in the direction crossing at right angles with the axis thereof. The driving pin 60 penetrates a long hole 61 defined in the base end portion 11a of the turret 11 and protrudes cirmumferentially from the long hole 61 as shown in FIG. 9, and turret side coupling 27b of the positioning engaging member 27 is connected with the driving pin 60.

The turret side coupling 27b is slidable relative to the base end portion 11a of the turret 11 by a spline 62. The clutch piece 31a is formed on the front surface of the turret side coupling 27b like the preferred embodiment.

In the turret device having the structure set forth above, when the ball screw 21 is turned when driven by the driving force of the first motor 24 (see FIG. 2), the nut 25 screwed into the ball screw 21 moves linearly along the rotary center O. Since the linear motion of the nut 25 is transmitted to the turret side coupling 27b via the driving pin 60, the turret side coupling 27b moves linearly along the rotary center O together with the nut 25.

In such a manner, when the turret side coupling 27b moves linearly leftward in FIG. 8, the turret side coupling 27b disengages from the base table side coupling 27a fixed to the base table 10, and the clutch piece 31a formed on the front surface of the turret side coupling 27b engages with the clutch piece 31b formed on the rear end edge of the annular gear 29.

In this state, when the annular gear 29 is rotated by the driving force of the second motor 32 (see FIG. 2), the same force is transmitted to the turret 11 by way of the clutch pieces 31a and 31b, turret side coupling 27b and spline 62, thereby indexing the turret 11.

Further, when the turret side coupling 27b moves linearly rightward in FIG. 8, the clutch piece 31a disengages from the clutch piece 31b and the turret side coupling 27b engages with the base table side coupling 27a fixed to the base table 10 so that the turret 11 is fixed to the base table 10 to prevent the rotation thereof.

According to another embodiment having the structure set forth above, it does not occur that the turret 11 moves in the axial direction to leap or skip so that the turret 11 does not interfere with surrounding components existing in front thereof. Further, since the turret 11 does not move linearly in the axial direction, the capacity of the hollow part defined inside the turret 11 is not changed and the air inside the hollow part does not flow so that no dust enters into the hollow part.

In the screw feed mechanism 26, the nut 25 serves as a driving side while the ball screw 21 serves as a driven side. In this case, the screw feed mechanism 26 can be structured exactly similarly to that of the preferred embodiment such that the ball screw 21 is fixed to the turret 11 and it moves linearly by the turning of the nut 25 which does not move in the axial direction but is turnable, and the turret 11 integrated with the ball screw 21 moves along the rotary center O.

If the screw feed mechanism 26 does not require low friction and high accuracy, an ordinary screw may be used instead of the ball screw 21.

In this case, it is preferable to provide a means for restraining the rotation of the turret 11 (e.g. a key and a spline which disengage from each other at the position where the clutch pieces 31a and 31b engage with each other) immediately before the clutch pieces 31a and 31b engage with each other.

Hirth couplings, etc., having the same structures as the curvic couplings may be used as the aforementioned positioning engaging members 27 in addition to the curvic couplings. A friction coupling (brake) having a sufficient braking force or a shot pin can be used as a positioning means instead of the couplings 27a and 27b as shown in FIG. 2, etc.

Still further, in the control system shown in FIG. 5, although the tool replacement position detecting sensor 49, coupling sensor 50, clutch sensor 51 and indexing sensor 52 are respectively structured to detect the rotary position or rotary torque of the servomotor, it is needless to say that these sensors may be replaced with an ordinary sensor for detecting a position, and three sensors except the indexing sensor 52 may be omitted. However, considering the safety of the apparatus, it is preferable to provide all these sensors.

As for the tool replacement position detecting sensor 49, it can be omitted in the turret device having a structure such that another tool provided with the turret 11 is always positioned in the tool replacement position during the cutting process by one tool (for example, the turret devices 2 which are provided on one tool slide while interposing the main spindle and opposing each other as shown in FIG. 1), and in this case, the detecting operation for detecting whether the turret device is positioned in the tool replacement position or not (S2 in FIG. 6) is also omitted.

INDUSTRIAL APPLICABILITY

The present invention does not need a power unit nor any supplementary facilities such as piping; reduces facility costs; and makes the apparatus small-sized by applying it to an indexing device such as a turret device employed by a lathe, particularly when positioning and engaging members for fixing or rotating a rotary table of the indexing device which are engageable with and disengageable from each other by the driving of the motor.

Further, since the positioning engaging members are driven by the motor, the operation speed and torque can be easily controlled, thereby performing the control at high speed with less shock. Particularly it is possible to avoid any cracking, chipping or abrasion caused by the collision between the positioning engaging members, thereby preventing the deterioration of the accuracy thereof.

What is claimed is:

1. An indexing device provided with a rotary table which indexes about a given rotary center relative to a base table comprising:

a pair of positioning engaging members which are engageable with and disengageable from each other between the base table and rotary table and which prevent the rotary table from rotating when they engage with each other;

a screw feed mechanism comprising a screw provided on a rotary center of the rotary table and a nut screwed onto the screw, wherein when the screw or nut turns, the nut or screw moves linearly relative to the screw or nut along an axis of the screw so as to permit the positioning engaging members to engage with or disengage from each other;

a first motor for turning and driving one of the screw or nut;

a second motor for indexing the rotary table; and a control means for rotating the first motor in a given rotating direction with a given ratio of rotating speed relative to a rotation of the second motor when the second motor is driven for indexing the rotary table.

2. The indexing device according to claim 1 further comprising a clutch member provided between the second motor and rotary table for permitting the second motor and rotary table to engage with each other when the positioning engaging members disengage from each other and for permitting the second motor and rotary table to disengage from each other when the positioning engaging members engage with each other.

3. A method of driving an indexing device comprising:

a base table, a rotary table which is indexed about a given rotary center relative to the base table, a pair of positioning engaging members which are engageable with or disengageable from each other between the base table and rotary table and which prevent the rotary table from rotating when they engage with each other;

a screw feed mechanism comprising a screw provided on a rotary center of the rotary table and a nut screwed onto the screw, said screw feed mechanism permitting the positioning engaging members to engage with or disengage from each other;

a first motor for driving said screw feed mechanism; and, a second motor for indexing the rotary table;

said method comprising:

driving the screw feed mechanism in a direction for permitting the positioning engaging members to disengage from each other when the first motor rotates;

indexing the rotary table when the second motor rotates after releasing the engagement between the positioning engaging members; and simultaneously rotating the first motor in a given rotating direction with a given ratio of rotating speed relative to a rotation of the second motor so as not to change a relative position between the screw and nut of the screw feed mechanism.

* * * * *